US008453539B2

(12) United States Patent
Anderson

(10) Patent No.: US 8,453,539 B2
(45) Date of Patent: Jun. 4, 2013

(54) GEARBOX APPARATUS AND METHOD OF MANUFACTURE

(75) Inventor: George E. Anderson, Champlin, MN (US)

(73) Assignee: Crown Iron Works Company, Roseville, MN (US)

( * ) Notice: Subject to any disclaimer, the term of this patent is extended or adjusted under 35 U.S.C. 154(b) by 264 days.

(21) Appl. No.: 12/477,491

(22) Filed: Jun. 3, 2009

(65) Prior Publication Data

US 2009/0301244 A1 Dec. 10, 2009

Related U.S. Application Data

(60) Provisional application No. 61/058,806, filed on Jun. 4, 2008.

(51) Int. Cl.
*F16H 57/02* (2012.01)
(52) U.S. Cl.
USPC .......................................... 74/606 R; 74/411
(58) Field of Classification Search
USPC .................... 74/412 R, 413–415, 606 R, 411
See application file for complete search history.

(56) References Cited

U.S. PATENT DOCUMENTS

| 2,046,982 A | * | 7/1936 | Warren | 184/109 |
| 2,237,958 A | * | 4/1941 | Hansen et al. | 74/606 R |
| 3,860,844 A | * | 1/1975 | Hetzel | 310/104 |
| 5,855,140 A | * | 1/1999 | Imamura | 74/42 |

* cited by examiner

*Primary Examiner* — Alicia Torres
(74) *Attorney, Agent, or Firm* — Nawrocki, Rooney & Sivertson, P.A.

(57) ABSTRACT

In one version of this invention, a gear box has mounting means such as a pair of facing walls for mounting the bearings for the axles carrying the gears. Each mounting means supports its bearing with a different stiffness to compensate for different loads imposed by gears that are closer to one of the bearings supporting the axle than the other. The different stiffness of each bearing mounting equalizes load-induced shifts of the position of the bearings holding the axle. Such a mounting equalizes such shifts, allowing the axles to remain substantially parallel and the gears in alignment. Aligned gears better maintain line contact between individual gear teeth, thereby reducing wear and breakage of the teeth.

2 Claims, 5 Drawing Sheets

GEARBOX APPARATUS AND METHOD OF MANUFACTURE

CROSS-REFERENCE TO RELATED APPLICATIONS

This is a regular application filed under 35 U.S.C. §111(a) claiming priority, under 35 U.S.C. §119(e)(1), of provisional application Ser. No. 61/058,806, previously filed Jun. 4, 2008 under 35 U.S.C. §111(b).

TECHNICAL FIELD

The present invention deals broadly with methods and apparatus for effecting transmission of rotational motion of an axle about one axis to rotational motion of an axle about a second, generally parallel axis. Such transmission is effected by means of apparatus conventionally referred to as a gearbox. More narrowly, the invention deals with methods and apparatus for maintaining gears within the box in a desired orientation in order to deter uneven wear or breakage of the gears.

BACKGROUND OF THE INVENTION

Gearboxes known in the art typically enclose one or more gear sets. Such gear sets are mounted on two or more shafts which traverse the gearbox between generally parallel, facing walls which are spaced from each other at a defined distance. In industry, such walls are typically made of iron, steel or other durable, substantially rigid material.

The gears are built, it is intended, to very precise tolerances. It is also intended that they be smooth and very hard. FIG. 1 illustrates a portion of engagement of teeth of one gear by teeth of a second gear. The arrows illustrate where force exerted by the drive gear is applied to teeth of the driven gear. Optimally, the point at which force is transmitted from one gear to another be lubricated so that all contact occurs at a location at which a film of oil is applied between the teeth. Gearboxes built this way, in theory, are expected to have a nearly infinite gear life. In practice, however, some gearboxes experience failure after a relatively short period of use. This often occurs due to pitting of the teeth at contact surfaces near one axial end of the gears. On occasion, fracture of teeth will even occur at areas of pitting.

Damage as described hereinbefore suggests that operation of the gears has been such that functioning has been less than perfect because the gears have not been operating with the gear faces parallel and teeth in exact parallel mesh. That is, operation has been such that one axial end of teeth has been in contact more extensively, thus overstressing the material of which the gears are made at that end.

Misalignment, it has been determined, occurs for a number of reasons. First, the walls defining the gearbox within which the axles to which the gears are journaled are not strong enough to prevent distortion when the gears in the gearbox are placed under a force. This results because the opposite walls are, in fact, subjected to different levels of force when the axial centers of the gears are not equidistant from the walls.

Another cause of misalignment results from the axles themselves. Even where the walls are strong enough so as to not distort when subjected to pressure, the axles to which the gears are mounted may distort so that planes defined by the faces of the respective gears become non-parallel.

It is to these shortcomings and deficiencies of the prior art that the present invention is directed. It is both a process and an apparatus which, it is intended, solves these problems.

SUMMARY OF THE INVENTION

The present invention is an apparatus and method for improving the operation and extending the life of a gearbox mounting therein a gear set. The apparatus is a gear set which, when force is applied thereto, effects maintenance of the faces of the gears of the gear set in a substantially parallel configuration. The maintenance of the gear faces in such a relationship is accomplished by effecting compensation of deflection of gear set mounting walls of the gearbox in which the gear sets are journaled.

The method of manufacturing such a gearbox includes steps of defining a gearbox housing by employing a pair of generally parallel, facing walls which are spaced from each other at a defined distance; mounting gears of a gear set between the walls in a meshed configuration where the gears define planes which, in unstressed positions thereof, are substantially parallel to planes defined by the walls; and utilizing means for mounting the gears such that, when they are under stress, the planes defined thereby remain substantially parallel to one another and to planes defined by the walls. In various embodiments, the walls of the gearbox and the axles to which the gears are mounted serve to effect disposing the gears in desired orientations.

The present invention is thus a method for constructing and manufacturing a gearbox and a gearbox assembled in accordance with the method. More specific details and advantages obtained in view of those details will become apparent with reference to the DETAILED DESCRIPTION OF THE INVENTION, appended claims and accompanying drawing figures.

DETAILED DESCRIPTION OF THE INVENTION

Figure 1:
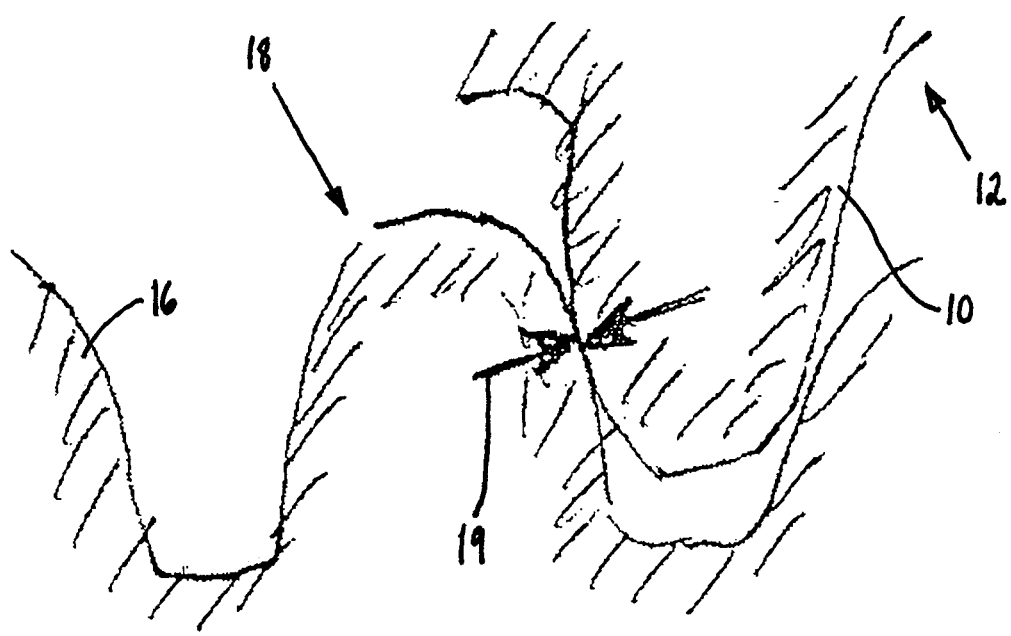
FIG. 1 is an end-on view illustrating typical engagement of teeth of a drive gear with teeth of a driven gear.

Referring now to the drawings wherein like reference numerals denote like elements throughout the several views, FIG. 1 illustrates in section, looking in an axial direction, the engagement of a tooth 10 of a drive gear 12 of a gear set in a gearbox 14 with a tooth 16 of a driven gear 18 in the gear set. As previously discussed, the gears 12, 18 are manufactured to very precise tolerances, and are made very smooth and hard. This protects the gear surfaces and extends the operational life of the gearbox 14.

In fact, it is the intent that the gear surfaces never actually touch during operation of the gearbox 14. Rather, they are intended to be spaced from one another at a very small distance, as at 19, filled by a film of oil. In any case, spacing, if any, between the closest point of touching of the gear teeth 10, 16 is intended to be substantially uniform along the axial dimensions of the teeth 10, 16. It is when the faces 20, 22 of the gears 12, 18 which are substantially engaged are diverted from a substantially parallel relationship of the gear faces 20, 22 that inordinate wear occurs.

Figure 2:
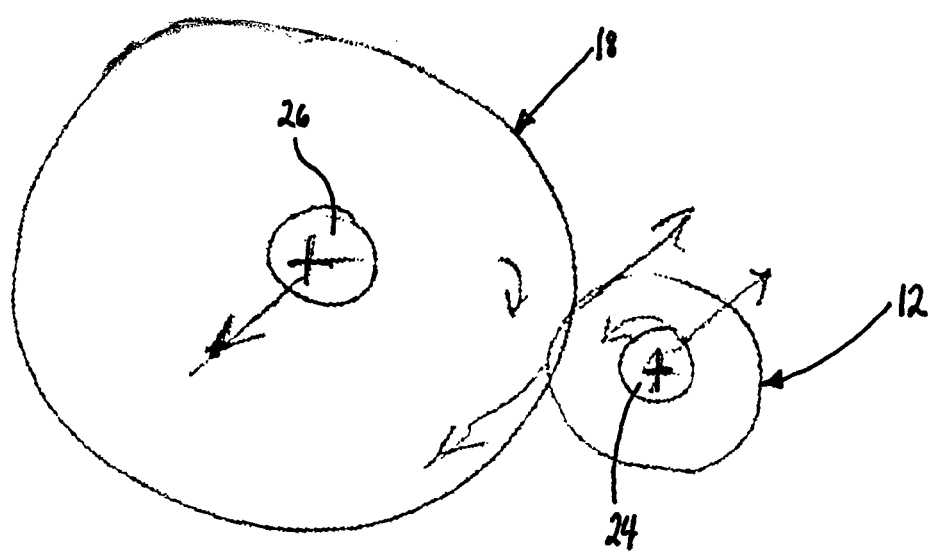
FIG. 2 is an end-on view illustrating the typical engagement of a drive gear with its corresponding driven gear.

FIG. 2 illustrates schematically the drive gear 12, and the axle 24 upon which it is mounted, in substantial engagement with the driven gear 18 and the axle 26 upon which it is disposed for rotation. The faces 20, 22 of the two gears, it will be understood, when the gear set is operating properly, will be in a parallel relationship.

Figure 3:
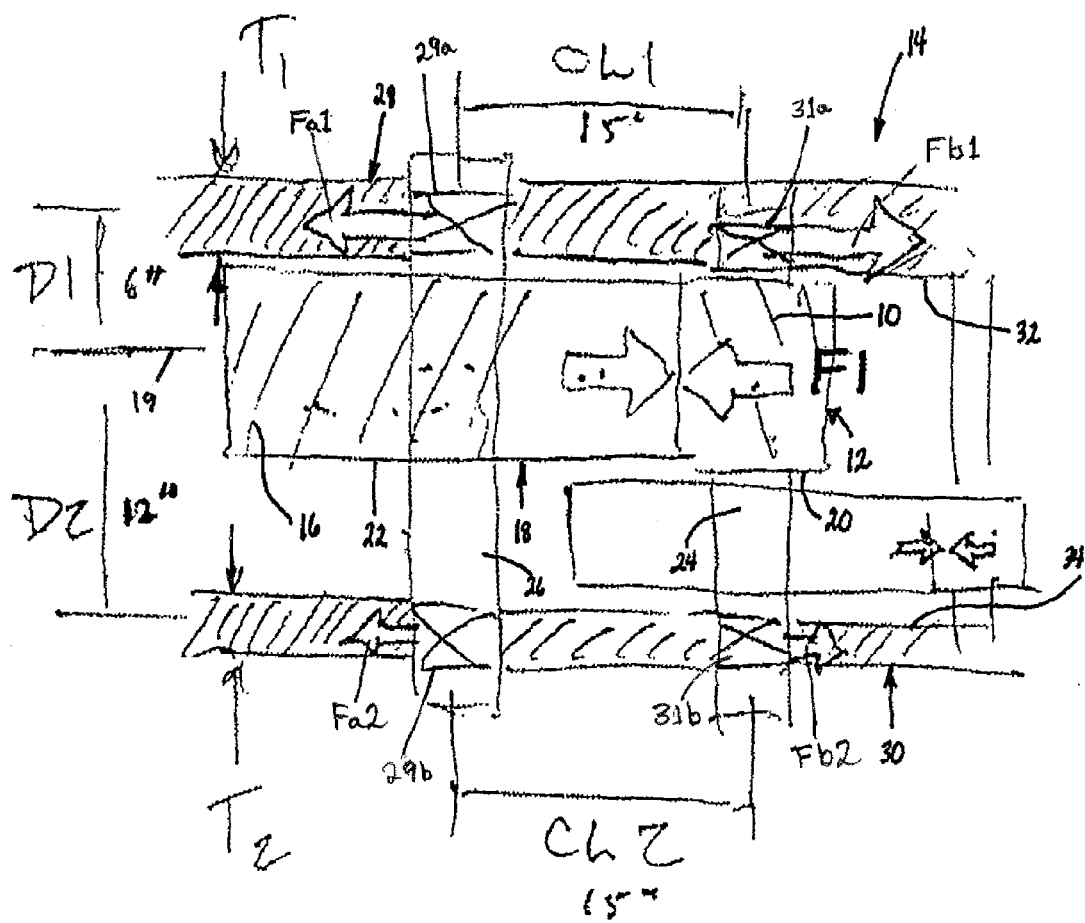
FIG. 3 is a top view, with some elements in section, illustrating a portion of a gearbox.

FIG. 3 illustrates portions of a gearbox 14 in which the gear set comprising drive gear 12 and driven gear 18 is mounted. Typically, the gearbox 14 is closed, and FIG. 3 illustrates the box 14 with some portions removed and two oppositely facing, substantially parallel walls 28, 30 of the gearbox 14 illustrated in section. Manufacturing these walls 28, 30 of the gearbox 14 with thicknesses substantially the same and the walls made of the same material is commonly observed in the industry. It will be understood that, if the axial center 19 of the gears 12, 18 is equidistant from the inner surfaces 32, 34 of the two substantially parallel, facing walls 28, 30, operation of the gear set will not likely cause any deflection from the desired dispositions of the gears 12, 18 wherein their faces 20, 22 are substantially parallel. This is so since the forces exerted upon the axles 24, 26 by gears 12 and 18 are evenly split between the substantially parallel walls 28, 30 of the gearbox 14, and thus are substantially the same. In most cases, however, for various reasons a gear set will be offset from a position wherein it is equidistant from the walls 28, 30 of the gearbox 14.

This is the disposition shown in FIG. 3, where the axial center 19 of gears 12 and 18 is spaced a gear space distance D1 from the centerline of wall 28 and a gear space distance D2 from the centerline of wall 30. During operation, drive gear 12 imposes a force F1 on driven gear 18 and axle 26. The force F1 imposed on axle 26 divides between bearings 29a and 29b as forces Fa1 and Fa2 in walls 32 and 30 respectively. The force F1 has an equal and opposite component imposed on axle 26 that divides between bearings 31a and 31b as forces Fb1 and Fb2 in walls 32 and 30 respectively. With high torques, force F1 is sufficient to elastically deform walls 32 and 30, shifting the position in walls 32 and 30 of the bearings 29a, 29b, 31a, and 31b in which axles 24 and 26 rotate. Simple principles of physics show that where D1 is smaller than D2 (shown as 6 in. and 12 in. in FIG. 3), forces Fa1 and Fb1 will be greater than forces Fa2 and Fb2. When walls 32 and 30 have similar stiffness, these asymmetric forces cause asymmetric shifting of bearing 29a in wall 32 relative to the shifting of bearing 29b in wall 30, and asymmetric shifting of bearing 31a in wall 32 relative to the shifting of bearing 31b in wall 30. Thus, in FIG. 3, if the walls 32 and 30 are of identical stiffness, the shift in position of bearings 29a and 31a is approximately twice the distance that bearings 29b and 31b shift, and gears 12 and 18 are not accurately aligned.

FIG. 3 shows gearbox 14 and the gear set comprising gears 12 and 18 under load. As explained above, when the drive gear 12 is in engagement with the driven gear 18 the force exerted upon the driven gear 18 and its mounting axle 26, and in turn transmitted to the upper wall 28, as shown in FIG. 2, will be greater than the force exerted upon the driven gear 18, its mounting axle 26, and the lower wall 30, as shown in FIG. 2, because of the location, axially along the gears, at which the force is applied. This translates into a canting of one axial end of the gears 12, 18 relative to the other and a consequent location of greater wear.

As previously discussed, the prior art utilizes walls that are substantially the same thickness and made of the same material. In order to deter such a consequence, it has been determined that the walls 28, 30 can be made of different thicknesses, even assuming of the same material, so that the wall which is typically subjected to greater force is thicker than the other wall. As the disparity of force exerted upon the two walls 28, 30 increases, the wall subjected to the greater force can be made of a thickness proportionately larger than the thickness of the other wall. In FIG. 3, wall 32 has thickness $T_1$ and wall 30 has thickness $T_2$, and both walls are made from the same material. Choosing different thicknesses $T_1$ and $T_2$ creates different stiffness for walls 30 and 32 to thereby provide when under load, the identical amount of shifting in walls for bearing sets 29a and 29b and for bearing sets 31a and 31b. This identical amount of shifting keeps axles 24 and 26 precisely parallel and thus maintains gears 12 and 18 in precise alignment. Preferably, the stiffness of each wall 32 and 30 is proportional to the forces imposed on each by force F1. For example, if wall 32 has forces imposed on it that are twice that imposed on wall 30, then thickness $T_1$ may be twice that of thickness $T_2$.

Alternatively, the walls 28, 30 can be made of different materials while maintaining a common thickness. The wall subjected to the greater force because of axial displacement of the gear set within the gearbox can also be made of a material which has a measure of stiffness greater than that of the material of which the other wall is manufactured. The disparity in the degree of stiffness necessary in order to maintain the gears 12, 18 in the desired orientations can be calculated based upon the relative distance between the axial center of the gears 12, 18 and the two walls 28, 30.

If a force exerted upon one wall of the gearbox 14 is twice that exerted on the other wall, either the thickness of the wall upon which the greater force is applied will have to be twice as thick as the other wall or the first wall will have to have twice a degree of stiffness of the second wall in order to maintain the gears in the desired dispositions. It has been mathematically shown that, if either the wall upon which the greater force is applied is of a factor of thickness of the wall upon which the lesser force is applied, or the wall upon which greater force is applied is given a factor of stiffness the same as the ratio of the forces applied to the teeth, the teeth will be maintained in a desired configuration.

Figure 4:
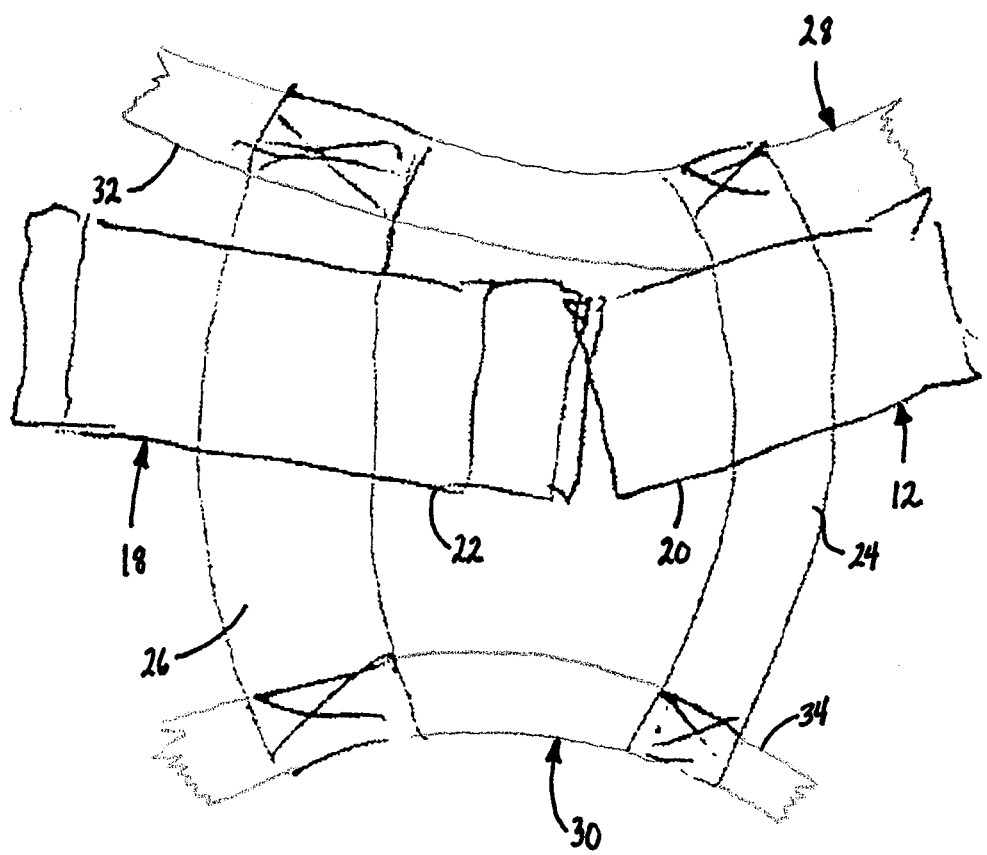
FIG. 4 is a view illustrating deflection of axles to which the drive gear and driven gear are mounted.

A second reason for the uneven wear of teeth is deflection of the axles as a result of repeated application of force. This situation is illustrated in FIG. 4. As can be seen, the faces of the drive and driven gear resultantly are displaced out of a substantially parallel orientation. Again, wear at one axial end of the teeth of the gears results.

Figure 5:
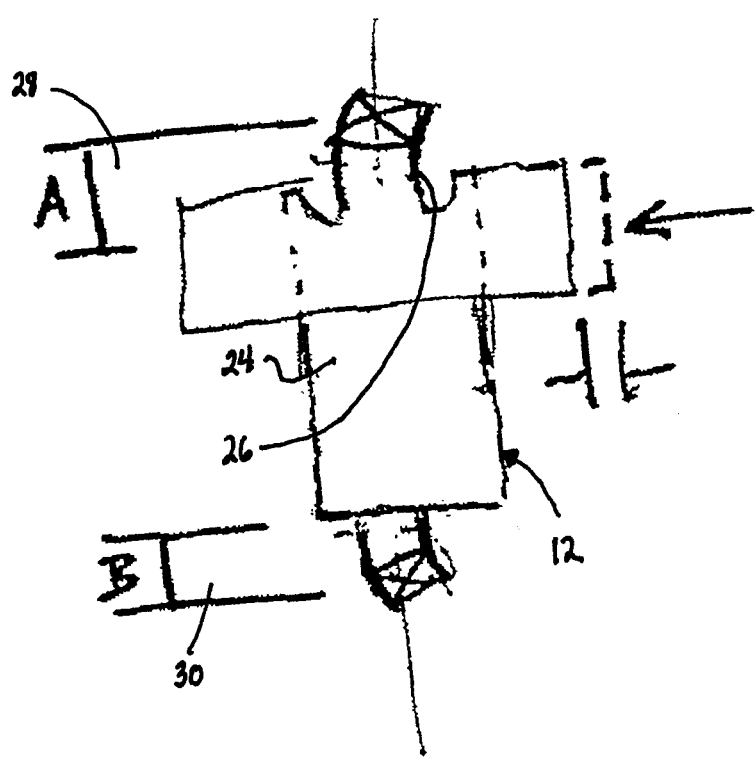
FIG. 5 is a view which illustrates a manner of solving such deflection problems.

FIG. 5 illustrates an inventive solution to this problem. The solution contemplates measurement of the distances between an outer face of the driven gear and its proximate wall, and the outer face of the drive gear and its proximate wall, respectively. Diameters of the respective gear axles 24, 26 are made so that the faces of the respective gears do not divert from a substantially parallel relationship should the mounting axles deflect.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:
1. A gear box comprising:
a) a housing having facing, substantially parallel first and second walls, said walls having a predetermined spacing, said first and second walls each composed of a metal, and said first wall having a greater stiffness than the second wall, wherein the ratio of the second wall thickness to the first wall thickness is substantially equal to the ratio of a first gear space distance to a second gear space distance;

b) first and second bearing sets, each comprising first and second bearings, each first bearing mounted in the first wall and each second bearing mounted in the second wall in axial alignment with the first bearing of its bearing set;

c) first and second axles each extending from the first to the second wall and respectively mounted for rotation in the first and second bearing sets; and d) first and second gears carried respectively by the first and second shafts, said gears in mesh and spaced from the first wall by the first gear space distance, and spaced from the second wall by the second gear space distance.

2. A gear box comprising:

a) a housing having facing, substantially parallel first and second walls, said walls having a predetermined spacing, said first and second walls each composed of a metal, and said first wall formed from a material having a first stiffness coefficient and the second wall formed from a material having a second stiffness coefficient, said first stiffness coefficient greater than the second stiffness coefficient;

b) first and second bearing sets, each comprising first and second bearings, each first bearing mounted in the first wall and each second bearing mounted in the second wall in axial alignment with the first bearing of its bearing set;

c) first and second axles each extending from the first to the second wall and respectively mounted for rotation in the first and second bearing sets; and d) first and second gears carried respectively by the first and second shafts, said gears in mesh and spaced from the first wall by a predetermined first gear space distance, and spaced from the second wall by a predetermined second gear space distance, wherein the ratio of the stiffness coefficient of the first wall material to the stiffness coefficient of the second wall material is substantially equal to the ratio of the second gear space distance to the first gear space distance.

\* \* \* \* \*